UNITED STATES PATENT OFFICE.

GEORG KALISCHER, OF FRANKFORT-ON-THE-MAIN, GERMANY, ASSIGNOR TO CASSELLA COLOR COMPANY, OF NEW YORK, N. Y.

RED TRISAZO DYE AND PROCESS OF MAKING SAME.

No. 886,985.  Specification of Letters Patent.  Patented May 5, 1908.

Application filed August 21, 1905. Serial No. 275,170. (Specimens.)

*To all whom it may concern:*

Be it known that I, GEORG KALISCHER, doctor of philosophy, a citizen of Prussia, and a resident of Frankfort-on-the-Main, in the Province of Hesse-Nassau and Kingdom of Prussia, Germany, have invented certain new and useful Improvements in Red Trisazo Dyes and Processes of Making Same, of which the following is a specification.

My invention consists in preparing trisazo dyes of the general formula

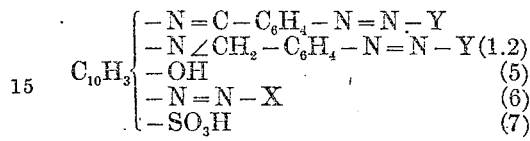

(X representing an aromatic radical such as $C_6H_5, C_6H_4CH_3$, Y an alpha or betanaphtholsulfoacid).

For the manufacture of the dyestuffs I use the 5.oxynaphthodiamidobenzaldehydin.7. sulfoacid obtained by condensing in aqueous solution one molecule of 1.2.diamidonaphthalene 5.oxy.7.sulfoacid with two molecules of m-amidobenzaldehyde (or m-nitrobenzaldehyde and subsequent reduction). The preparation of this compound is described in my co-pending application, Serial No. 275,171, filed August 21, 1905, issued December 12th, 1905, Letters Patent No. 807,117. Starting from this sulfoacid I can prepare the coloring matters in two slightly different ways, either by combining a diazo compound in alkaline solution with the said sulfoacid, tetrazotizing the body thus obtained and combining it in alkaline solution with two molecules of a naphtholsulfoacid, or by first tetrazotizing the sulfoacid, combining in alkaline solution with two molecules of an alpha or a betanaphtholsulfoacid and finally coupling with a diazo compound. These I consider as equivalent procedures for producing the same product, only the sequence of steps in the process being changed.

The dyestuffs produced according to the two ways are of course identical. They have the property of dyeing unmordanted cotton direct in shades varying from yellowish-red to bluish-red. The colors are exceedingly fast to washing and to acids.

The method of production is illustrated by the following examples:

Example 1. 46 kilos 5.oxynaphthodiamidobenzaldehydin sulfoacid are dissolved in water with 11.5 kilos caustic soda of 40° Bé., then 13.8 kilos nitrite of sodium are added; the solution thus obtained is slowly introduced into a cooled mixture of 72 kilos hydrochloric acid of 20° Bé. and about 500 kilos water. The tetrazo body is poured into a solution of 49.2 kilos 2.naphthol-6.sulfoacid (sodium salt) containing an excess of soda. As soon as the reaction is complete, the diazo solution of 9.3 kilos anilin prepared in the usual way is added. After stirring for some hours and slowly heating to about 60° C., the dyestuff is precipitated by means of common salt.

Example 2. 9.3 kilos anilin are diazotized and introduced into the cooled solution of 46 kilos 5.oxynaphthodiamidobenzaldehydin. 7.sulfoacid containing an excess of soda. The combination being finished, the solution is acidulated with a sufficient quantity of hydrochloric acid, tetrazotized with 13.8 kilos nitrite of sodium and poured into a cooled solution of 49.2 kilos-2.naphthol.6. sulfonate of soda in the presence of an excess of carbonate of soda. The dyestuff is precipitated with common salt, filtered off and dried.

Having now described my invention and the manner in which it may be carried out, what I claim is:

1. The herein described process of producing red trisazo dyes, which consists in combining one molecule of a diazo compound with one molecule of 5 oxynaphthodiamidobenzaldehydin.7.sulfo acid, then tetrazotizing this body and then combining said body with two molecules of a naphthol-sulfoacid.

2. The herein described process of producing red trisazo dyes, which consists in combining in an alkaline solution, one molecule of a diazotized aromatic amin with one molecule of the 5-oxynaphthodiamidobenzaldehydin-7-sulfoacid, then tetrazotizing the body thus obtained, and then combining it in an alkaline solution, with two molecules of a naphthol-sulfoacid.

3. The herein described process of producing red trisazo dyes, which consists in first diazotizing anilin, then introducing the same in a cool solution of 5-oxynaphthodiamidobenzaldehydin-7-sulfoacid, containing an excess of soda, then acidulating said solution with hydrochloric acid, then tetrazotizing with sodium nitrate, then mixing with a cool solution of 2-naphthol-6-sodium sulfonate in the presence of an excess of sodium carbonate and finally precipitating with common salt.

4. The coloring matters obtained as hereinbefore described having the following characteristics: the said trisazo coloring matters represent in the dry state powders of a reddish-brown shade, soluble in water with a red color, dissolve in concentrated sulfuricacid with a bluish-red color which changes into a more yellowish shade when water is added, and which dye unmordanted cotton red shades substantially as described.

Signed at Frankfort-on-the-Main in the Province of Hesse-Nassau and Kingdom of Prussia this 31st day of July A. D. 1905.

GEORG KALISCHER.

Witnesses:
 JEAN GRUND,
 CARL GRUND.